UNITED STATES PATENT OFFICE.

HEINRICH WULKAN, OF VIENNA, AUSTRIA-HUNGARY, ASSIGNOR TO DEXTRIN AUTOMAT, GESELLSCHAFT M. B. H., OF VIENNA, AUSTRIA-HUNGARY, A CORPORATION OF AUSTRIA.

PROCESS OF SEPARATING THE GERM OR GERM AND HULL FROM CORN AND THE PRODUCT OF SUCH PROCESS.

1,045,490.  Specification of Letters Patent.  Patented Nov. 26, 1912.

No Drawing.  Application filed January 19, 1912.  Serial No. 672,206.

*To all whom it may concern:*

Be it known that I, HEINRICH WULKAN, a citizen of the Empire of Austria-Hungary, residing at Vienna, in the Empire of Austria-Hungary, have invented a new and useful Improvement in the Process of Separating the Germ or Germ and Hull from Corn and the Product of Such Process, of which the following is a specification.

This invention relates to a process of separating the germ, or the germ and hull, from the starchy portion of kernels of corn or maize and obtaining the starchy portion, as well as the germ, in a substantially unbroken condition; it further relates to a novel product resulting from such process; and it comprises a process of treating the whole kernel of corn with dilute acid for a period of time sufficient to soften the kernel and to substantially destroy the adhesion of the germ, or the germ and hull, to the other portions of the grain, and thereafter separating the germ, or the germ and hull, from the kernel; and it further comprises the kernel thus separated and obtained in a novel form and condition, all as more fully hereinafter set forth and as claimed.

In the known processes of separating the germ from the remaining or starchy portion of the corn, the starchy kernel has been obtained either in a broken or disintegrated condition or in solution or suspension. The mechanical processes of grinding, or crushing, result in the formation of a more or less finely ground or broken product with accompanying loss, and if the corn is first cooked or treated with steam or strong alkalis more or less of the starchy substance is modified and disintegrated and lost by solution or lixiviation.

By the process of the present invention the starchy kernel is obtained, on the other hand, in a substantially integral and unbroken condition, but nevertheless separated from the germ and hull and entirely or substantially free from fatty constituents.

I have found that if the corn is soaked in a suitable dilute acid and left in this acid for some time the kernels of the corn are softened and the adhesion of the germ and hull to the starchy portion of the kernel is sufficiently destroyed so that separation of these parts from each other without injury may be effected. By this acid treatment not only are the kernels softened, but their brittleness is at the same time decreased. The kernels thus softened are separated into their various parts,—germ, hull, and starchy kernel—by suitable treatment, as by subjecting them to slight pressure or rubbing, germ and starchy kernel being thus obtained in a substantially unbroken and integral condition.

The further separation and isolation of the starchy kernels and germs from each other can be carried out in various ways. They may, for instance, be suspended in a brine solution of a sufficient density to float the germs but not the kernels; or the mixed germs and kernels can be dried and thereafter separated as by sifting; or other methods of separating can be employed.

After drying, the starchy portions of the kernels are obtained in much the shape of the original kernel, and freed from the germ and hull of the original corn. Moreover the starchy kernels are in a substantially integral and unbroken condition, thus avoiding the losses and waste of the known processes of separating corn wherein grinding, cracking, or dissolving of the starchy material takes place.

The separation of the starchy portion from the germ and hull according to the present invention gives a product containing the starchy portion of the corn entirely or substantially free from any adhering or intermixed fat or oily constituents, and in a state of great purity. Analysis of a representative product of the present process for example, gave the following percentages.

| | |
|---|---|
| Water | 11.68% |
| Protein | 7.94" |
| Fat | 0.07" |
| Carbohydrates | 79.57" |
| Fibers | 0.39" |
| Ashes | 0.35" |

The invention is further illustrated by the following example: 100 kilos of corn are soaked in 125 liters of water containing about 2500 gms. of hydrochloric acid at about 35° C. After about 36 hours the structure of the corn is sufficiently loosened so that the three parts of the corn,—the kernel, germ and hull,—can be separated from each other. This is effected by pressing, or by passing the corn between rollers suitably adjusted, after which the germs and kernels, before or after drying, are further separated by means of a brine solution, as above indicated, or other mechanical processes or apparatuses. The germs and kernels may finally be dried to remove part or all of their contained moisture.

The process is hastened by the use of a stronger acid than that indicated, or by the use of a higher temperature, but the temperature should not be sufficient to materially disintegrate the starchy portion of the kernel. Also other acids than hydrochloric may be used, as sulfuric, etc. A somewhat longer treatment is necessary for old and dry corn than for new and softer corn. The soaking liquor may be used over again, for treating further amounts of corn, or it may be mixed with a fresh amount of liquor and then again used. The kernels taken from the soaking liquor are then washed with water until reasonably free from acid and the wash liquors containing soluble matter may be utilized for feeding purposes after neutralizing and suitable concentration.

Corn from which the hulls have been already removed may be treated according to the process of the present invention and the germs and starchy portions of the kernels separated as above indicated.

I claim:

1. The process of separating the germ from the starchy kernel of corn which comprises soaking the corn in dilute acid to soften the same, and separating the germ from the kernel by a pressure insufficient to materially disintegrate the starchy kernel.

2. The process of separating the germ from the starchy kernel of corn which comprises soaking the corn in dilute acid until the adhesion of the germ to the starchy kernel is substantially destroyed, and separating the germ from the kernel without materially breaking up the starchy portion.

3. The process of separating the germ from the starchy kernel of corn which comprises soaking the corn in dilute hydrochloric acid to soften the same, and separating the germ from the kernel by pressure insufficient to materially disintegrate the starchy kernel.

4. The process of separating the germ from the starchy kernel of corn which comprises soaking the corn in dilute hydrochloric acid until the adhesion of the germ to the kernel is substantially destroyed, and separating the germ from the kernel without materially breaking up the starchy portion.

5. The process of separating the germ and hull from the starchy portion of corn which comprises soaking the corn in a dilute acid to soften the same, and separating the germ and hull from the kernel by a pressure insufficient to materially disintegrate the starchy kernel.

6. The process of separating the germ and hull from the starchy portion of corn which comprises soaking the corn in a dilute acid until the adhesion of the germ and hull to the starchy kernel is substantially destroyed, and separating the germ and hull from the kernel without materially breaking up the starchy portion.

7. The process of separating the germ and hull from corn which comprises soaking the corn in dilute hydrochloric acid to soften the same, and separating the germ and hull from the kernel by a pressure insufficient to materially disintegrate the starchy kernel.

8. The process of separating the germ and hull from the starchy kernel of corn which comprises soaking the corn in dilute hydrochloric acid until the adhesion of the germ and hull to the starchy kernel is substantially destroyed, and separating the germ and hull from the starchy kernel without materially breaking up the starchy kernel.

9. As a new product the starchy portions of kernels of corn which has been treated with dilute acid, said starchy portions being in much the shape of the original kernels, substantially integral and unbroken, and free from hulls and germs, and containing less than one-tenth per cent. of oil or fat.

10. As a new product the starchy portions of kernels of corn which has been treated with dilute acid, said starchy portions being in much the shape of the original kernels but somewhat flattened, substantially integral and unbroken, and free from hulls and germs, and substantially free from oil and fat.

In testimony whereof I have hereunto set my hand in the presence of two subscribing witnesses.

HEINRICH WULKAN.

Witnesses:
GUSTAV LEDERER,
ADA MARIA BERGER.